(12) United States Patent
Tanaka et al.

(10) Patent No.: US 12,475,931 B2
(45) Date of Patent: Nov. 18, 2025

(54) CAPACITIVE SENSING WITH A MICRO PUMP IN A MEMORY DEVICE

(71) Applicant: Micron Technology, Inc., Bosie, ID (US)

(72) Inventors: Tomoharu Tanaka, Yokohama (JP); Yoshihiko Kamata, Yokohama (JP); Yoshiaki Fukuzumi, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 45 days.

(21) Appl. No.: 18/405,096

(22) Filed: Jan. 5, 2024

(65) Prior Publication Data

US 2024/0257842 A1 Aug. 1, 2024

Related U.S. Application Data

(60) Provisional application No. 63/442,268, filed on Jan. 31, 2023.

(51) Int. Cl.
| | | |
|---|---|---|
| *G11C 7/00* | (2006.01) | |
| *G11C 5/06* | (2006.01) | |
| *G11C 5/14* | (2006.01) | |
| *G11C 16/30* | (2006.01) | |

(52) U.S. Cl.
CPC .............. *G11C 5/145* (2013.01); *G11C 5/063* (2013.01); *G11C 16/30* (2013.01)

(58) Field of Classification Search
CPC ....... G11C 7/1051; G11C 7/22; G11C 7/1072; G11C 7/1006; G11C 7/1066
USPC ................................ 365/189.15, 189.05, 203
See application file for complete search history.

(56) References Cited

U.S. PATENT DOCUMENTS 11,131,176 B1 * 9/2021 Haustveit ............... E21B 43/267
2014/0347928 A1 * 11/2014 Lee .......................... G11C 16/10
365/185.11

* cited by examiner

*Primary Examiner* — Son T Dinh
(74) *Attorney, Agent, or Firm* — Lowenstein Sandler LLP

(57) ABSTRACT

A memory device includes an array of strings of memory cells, a local bitline coupled with a plurality of the strings of memory cells, and a sense transistor having a gate terminal coupled with the local bitline. The memory device further includes a series of transistors have a data read path between a source line and the sense transistor and between the sense transistor and a global bitline that is coupled with a page buffer. A micropump is integrated within the series of transistors. Control logic is coupled with the series of transistors and to, during a read operation of a memory cell of the array and in response to the sense transistor turning on, activate the micropump to cause a constant read current to flow between the global bitline and the source line.

20 Claims, 12 Drawing Sheets

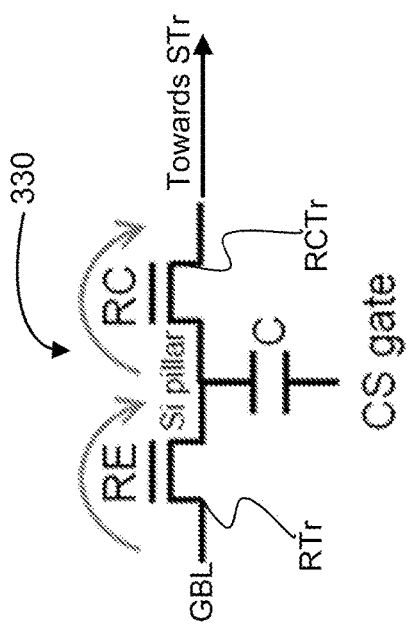
FIG. 4A
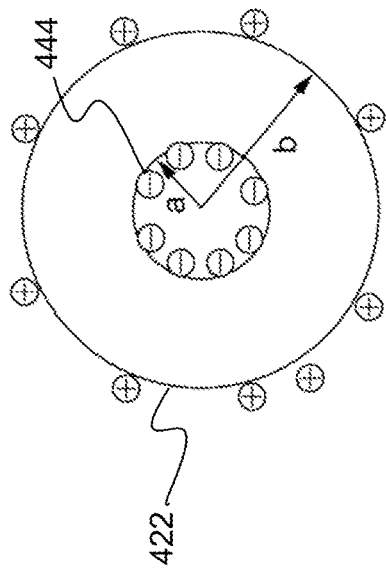
FIG. 4C
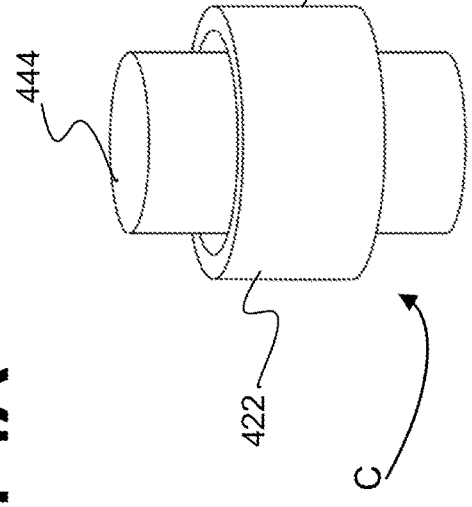
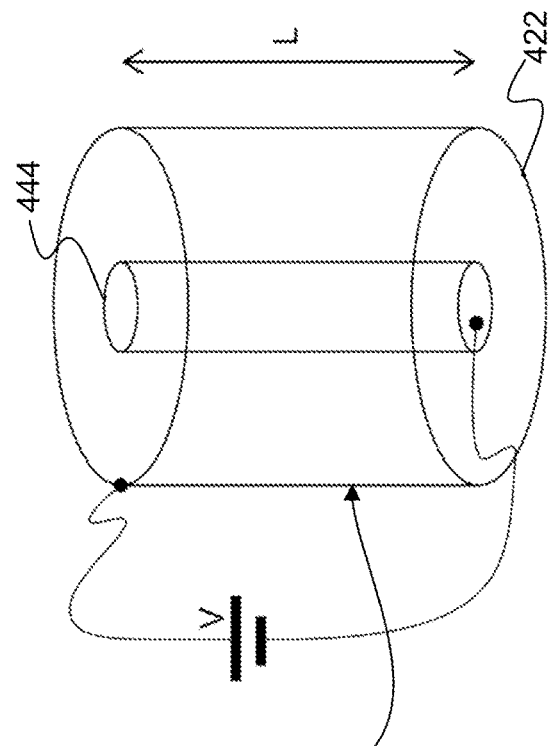
FIG. 4B

600

```
┌─────────────────────────────────────────────────────────┐
│ Activate a write enable signal and a bit line clamp     │
│ signal to pre-charge a global bit line coupled with a   │
│ page buffer.                                            │
│                          610                            │
└─────────────────────────────────────────────────────────┘
                              │
                              ▼
┌─────────────────────────────────────────────────────────┐
│ After a pre-charge period, causing a voltage of a       │
│ selected wordline to ramp up, the selected wordline     │
│ being associated with a memory cell to be read by the   │
│ page buffer.                                            │
│                          620                            │
└─────────────────────────────────────────────────────────┘
                              │
                              ▼
┌─────────────────────────────────────────────────────────┐
│ Deactivate the bitline clamp signal after a clamping    │
│ period.                                                 │
│                          630                            │
└─────────────────────────────────────────────────────────┘
                              │
                              ▼
┌─────────────────────────────────────────────────────────┐
│ In response to detecting a sense transistor being       │
│ turned on, activate a micropump that is integrated      │
│ within a data read path positioned, at least in part,   │
│ between the sense transistor and the global bit line,   │
│ wherein a gate terminal of the sense transistor is      │
│ coupled with a local bit line that is associated with   │
│ the memory cell.                                        │
│                          640                            │
└─────────────────────────────────────────────────────────┘
```

FIG. 6

CAPACITIVE SENSING WITH A MICRO PUMP IN A MEMORY DEVICE

REFERENCE TO RELATED APPLICATION

This application claims the benefit of U.S. Provisional Patent Application No. 63/442,268, filed Jan. 31, 2023, the entirety of which is incorporated herein by reference.

TECHNICAL FIELD

Embodiments of the disclosure are generally related to memory sub-systems, and more specifically, relate to capacitive sensing with a micropump in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

FIG. 4A is a schematic diagram of the micropump of FIG. 3 according to an embodiment.

FIGS. 4B-4C is a perspective view and a top view, respectively, of the capacitor (C) of the micropump of FIG. 4A according to some embodiments.

FIG. 6 is a flow diagram of an example method of capacitive sensing using a micropump integrated within a memory device according to various embodiments.

DETAILED DESCRIPTION

Figure 1A:
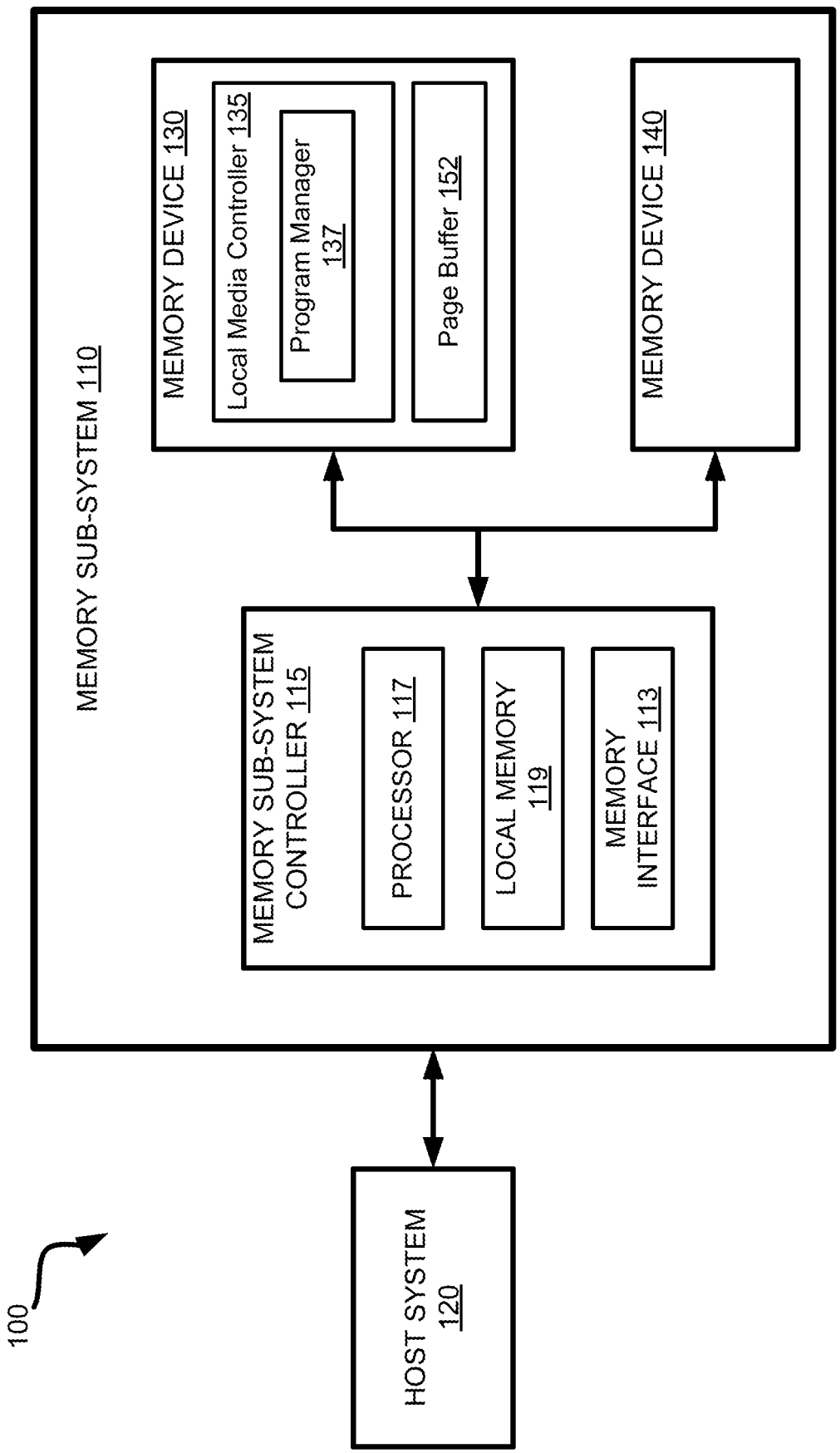
FIG. 1A illustrates an example computing system that includes a memory sub-system in accordance with some embodiments.

Embodiments of the present disclosure are directed to capacitive sensing with a micropump in a memory device. One or more memory devices can be a part of a memory sub-system, which can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a NOT-and (NAND) memory device. Other examples of non-volatile memory devices are described below in conjunction with FIG. 1A. A non-volatile memory device is a package of one or more dice. Each die can include two or more planes. For some types of non-volatile memory devices (e.g., NAND devices), each plane includes of a set of physical blocks. In some implementations, each block can include multiple sub-blocks. Each plane carries a matrix of memory cells formed on a silicon wafer and joined by conductors referred to as wordlines (WLs) and bitlines (BLs), such that a wordline joins multiple memory cells forming a row of the matrix of memory cells, while a bitline joins multiple memory cells forming a column of the matrix of memory cells.

Depending on the cell type, each memory cell can store one or more bits of binary information, and has various logic states that correlate to the number of bits being stored. The logic states can be represented by binary values, such as "0" and "1," or combinations of such values, also referred to herein as logical bit values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines. Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cell (SLCs) and between multiple logical levels for multi-level cells.

In certain memory devices, memory arrays are built in three-dimensional (3D), multi-layered structures with memory cells coupled to pillars that form strings of transistors. Each pillar is coupled to a local bitline via an individual select gate controllable by a drain select line (SGD) signal. A sense transistor (STr) is coupled to the local bitline and turns ON or OFF depending on a voltage potential level of the local bitline (LBL), which is a result of a read process of a selected memory cell within one of the strings. In some memory devices, the sense transistor transfers data from the memory cell to a page buffer through a global bitline using an all bitline (ABL) scheme, e.g., where all global bitlines are accessed at the same time. In the ABL scheme, the sense transistor functions as a memory cell, e.g., has a small dimension similar to a memory cell, and its poly-silicon body has a threshold voltage (Vt) that varies not only from wafer to wafer, but also from die to die and sometimes even from sensing transistor to sensing transistor. Thus, while employing the ABL scheme more efficiently reads data from multiple arrays at a time, due to the Vt variability across multiple global bitlines, the process of accurate data transfer via the ABL scheme is made more challenging than individual data transfers of a single global bitline at a time.

Aspects of the present disclosure address the above and other deficiencies through integrating a micropump into a reading hardware layer that is positioned between each sensing transistor and each global bitline. The reading hardware layer, for example, can be configured with a series of transistors that includes a data read path between a source line and the sense transistor and between the sense transistor and the global bitline that is coupled with a page buffer. Thus, in at least one embodiment, the micropump is integrated within the series of transistors, e.g., between the sense transistor and the global bitline via which the read current is provided. Control logic of the memory device can be coupled with the series of transistors, and be configured to, during a read operation of a memory cell of the array and in response to the sense transistor turning on, activate the micropump to cause a constant read current to flow between the global bitline and the source line.

In various embodiments, by generating a constant current with modulating the micropump, the control logic reduces the impact to the read current of the intrinsic variabilities in Vt of the sense transistor. In at least some embodiments, the micropump includes several transistors strung together. For example, the micropump can include a read transistor coupled with the global bitline, a read capacitor transistor coupled with the sense transistor, and a capacitor coupled between the read transistor and the read capacitor transistor. In some embodiments, the capacitor is a depletion-type transistor having a cylindrical gate surrounding a semiconductive pillar of the micropump.

In some embodiments, to activate the micropump, the control logic repetitively: causes the read transistor to turn on; after a first period, causes the read transistor to turn off; after the read transistor is turned off, causes the read capacitor transistor to turn on; and after a second period, causes the read capacitor transistor to turn off. Stepping through this series of control operations at a sufficiently high speed enables modulating a constant current to flow between the global bitline and the source line through the sense transistor.

Therefore, advantages of the systems and methods implemented in accordance with some embodiments of the present disclosure include, but are not limited to, causing a constant current to flow through sense transistors of a memory device to reduce variability of the read current due to the variability in threshold voltage of each sense transistor. The micropump described herein may also be employed to drive a global bitline in other contexts, including computing-in-memory (CIM) architecture used for artificial intelligence such as machine learning, as well as a replacement for a current mirror used to generate a reference current for each column of one or more arrays of memory cells. Other advantages will be apparent to those skilled in the art of memory sensing architecture, which will be discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such media or memory devices.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. The host system 120 can provide data to be stored at the memory sub-system 110 and can request data to be retrieved from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NOT-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple-level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOT-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage a memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (or processing device) configured to execute instructions stored in local memory 119 for performing the operations described herein.

In at least one embodiment, the memory device 130 includes a program manager 137 configured to carry out memory operations, e.g., in response to receiving memory access commands from the memory interface 113. In some implementations, the local media controller 135 includes at least a portion of the program manager 137 and is configured to perform the functionality described herein. In some implementations, the program manager 137 is implemented on the memory device 130 using firmware, hardware components, or a combination of the above. In some embodiments, control logic of the program manager 137 is integrated in whole or in part within the memory sub-system controller 115 and/or the host system 120. In some embodiments, the memory device 130 includes a page buffer 152, which can provide at least some of the circuitry used to program data to the memory cells of the memory device 130 and to read the data out of the memory cells.

Figure 1B:
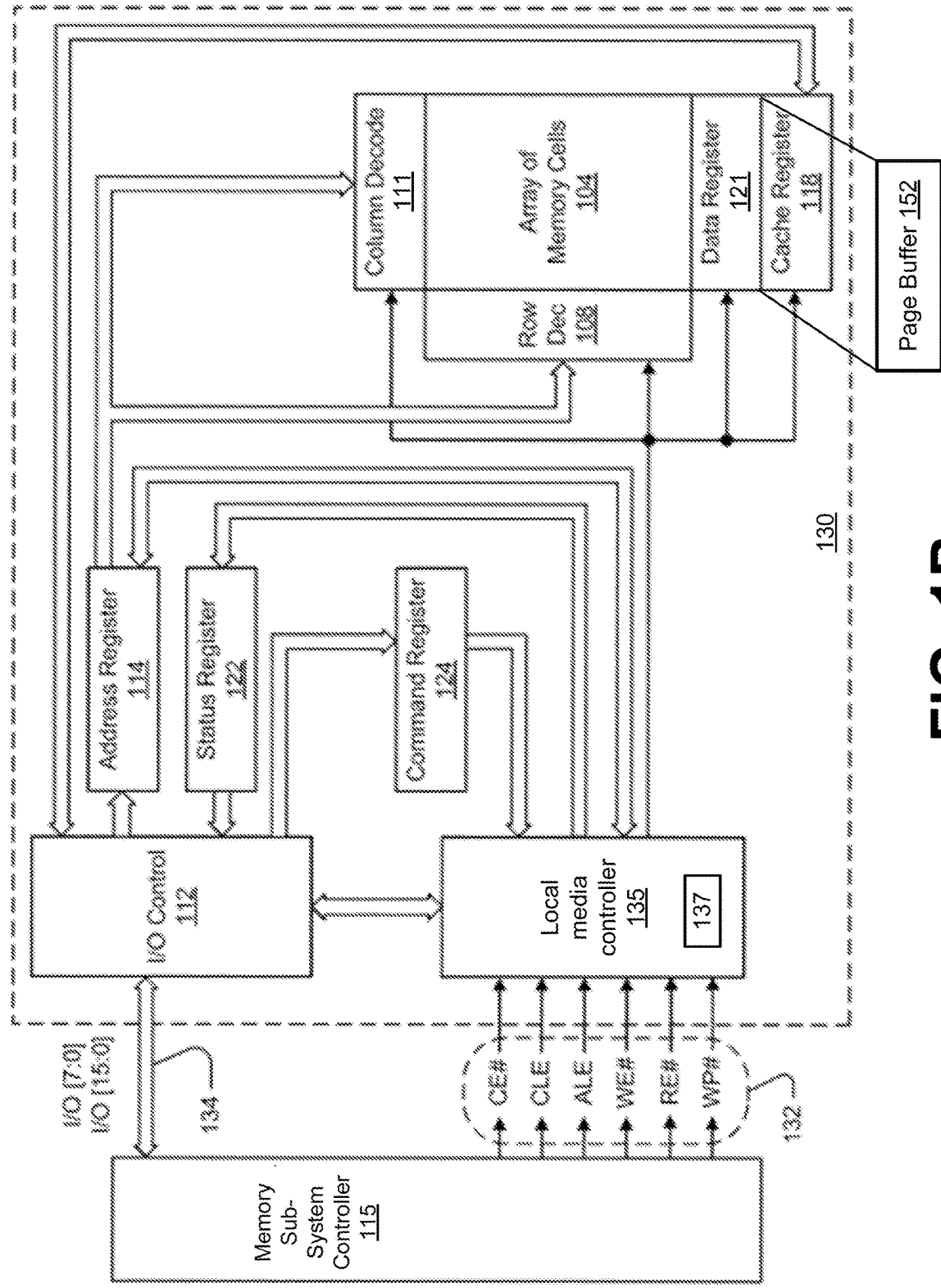
FIG. 1B is a block diagram of a memory device in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., the memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

The memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 1B) of at least a portion of the array of memory cells 104 are capable of being programmed to one of at least two target data states.

Row decode circuitry 108 and column decode circuitry 111 are provided to decode address signals. Address signals are received and decoded to access the array of memory cells 104. The memory device 130 also includes input/output (I/O) control circuitry 112 to manage input of commands, addresses and data to the memory device 130 as well as output of data and status information from the memory device 130. An address register 114 is in communication with the I/O control circuitry 112 and row decode circuitry 108 and column decode circuitry 111 to latch the address signals prior to decoding. A command register 124 is in communication with the I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 111 to control the row decode circuitry 108 and column decode circuitry 111 in response to the addresses.

The local media controller 135 is also in communication with a cache register 118 and a data register 121. The cache register 118 latches data, either incoming or outgoing, as directed by the local media controller 135 to temporarily store data while the array of memory cells 104 is busy writing or reading, respectively, other data. During a program operation (e.g., write operation), data can be passed from the cache register 118 to the data register 121 for transfer to the array of memory cells 104; then new data can be latched in the cache register 118 from the I/O control circuitry 112. During a read operation, data can be passed from the cache register 118 to the I/O control circuitry 112 for output to the memory sub-system controller 115; then new data can be passed from the data register 121 to the cache register 118. The cache register 118 and/or the data register 121 can form (e.g., can form at least a portion of) the page buffer 152 of the memory device 130. The page buffer 152 can further include sensing devices such as a sense amplifier, to sense a data state of a memory cell of the array of memory cells 104, e.g., by sensing a state of a data line connected to that memory cell. A status register 122 can be in communication with I/O control circuitry 112 and the local memory controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 112 and can then be written into a command register 124. The addresses can be received over input/output (I/O) pins [7:0] of I/O bus 134 at I/O control circuitry 112 and can then be written into address register 114. The data can be received over input/output (I/O) pins [7:0] for an 8-bit device or input/output (I/O) pins [15:0] for a 16-bit device at I/O control circuitry 112 and then can be written into cache register 118. The data can be subsequently written into data register 121 for programming the array of memory cells 104.

In an embodiment, cache register 118 can be omitted, and the data can be written directly into data register 121. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2A:
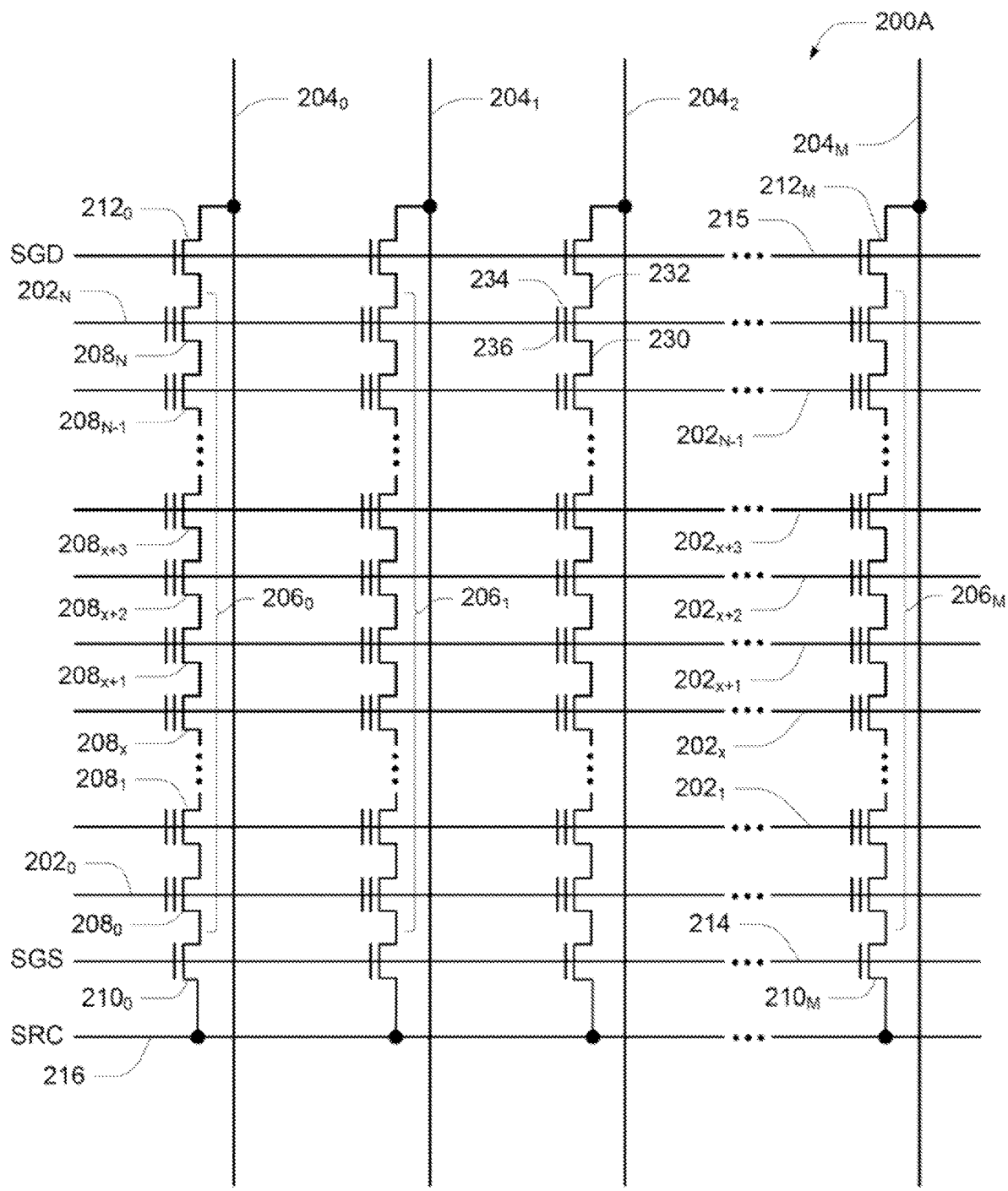
FIG. 2A-2B are schematics of portions of an array of memory cells as could be used in a memory of the type described with reference to FIG. 1B according to an embodiment.
Figure 2B:
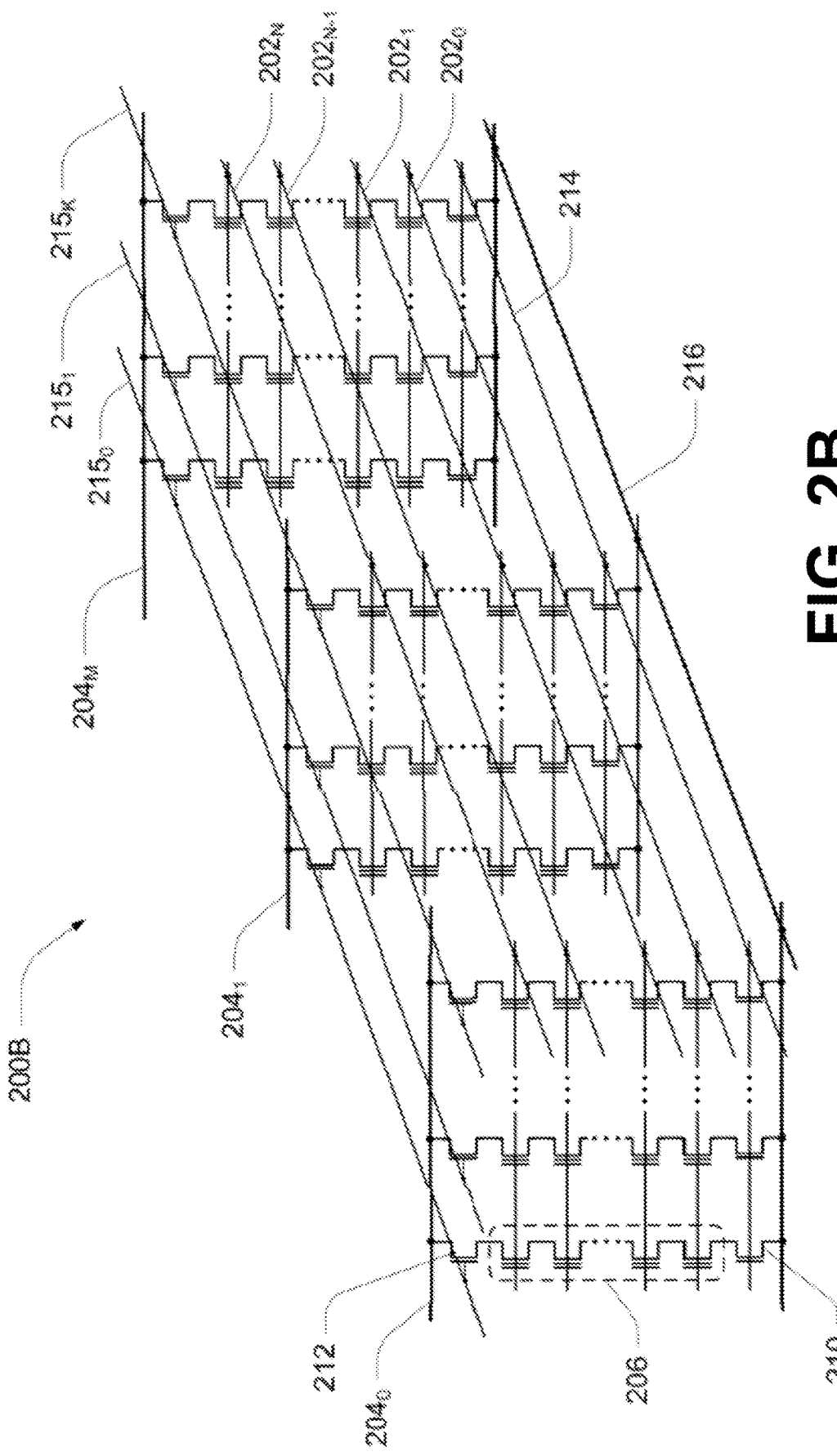

FIG. 2A-2B are schematics of portions of an array of memory cells 200A, such as a NAND memory array, as could be used in a memory of the type described with reference to FIG. 1B according to an embodiment, e.g., as a portion of the array of memory cells 104. Memory array 200A includes access lines, such as wordlines $202_0$ to $202_N$, and data lines, such as bitlines $204_0$ to $204_M$. The wordlines 202 can be connected to global access lines (e.g., global wordlines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a wordline 202) and columns (each corresponding to a bitline 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $212_0$ can be connected to the bitline $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bitline 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bitlines 204 (e.g., bitlines $204_0$, $204_2$, $204_4$, etc.) can be one physical page of the memory cells 208 (e.g., even memory cells) while memory cells 208 commonly connected to wordline $202_N$ and selectively connected to odd bitlines 204 (e.g., bitlines $204_1$, $204_3$, $204_5$, etc.) can be another physical page of the memory cells 208 (e.g., odd memory cells).

Although bitlines $204_3$-$204_5$ are not explicitly depicted in FIG. 2A, it is apparent from the figure that the bitlines 204 of the array of memory cells 200A can be numbered consecutively from bitline $204_0$ to bitline $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 2B is another schematic of a portion of an array of memory cells 200B as could be used in a memory of the type described with reference to FIG. 1B, e.g., as a portion of the array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars. The NAND strings 206 can be each selectively connected to a bitline $204_0$-$204_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $215_0$-$215_K$ to selectively activate particular select transistors 212 each between a NAND string 206 and a bitline 204. The select transistors 210 can be activated by biasing the select line 214. In some embodiments, each sub-block or string of memory cells has a separate select line 214 from other sub-blocks or strings. In some embodiments, a pair of sub-blocks shares a select line 214. Each wordline 202 can be connected to multiple rows of memory cells of the memory array 200B. Rows of memory cells that are commonly connected to each other by a particular wordline 202 can collectively be referred to as tiers.

Figure 3:
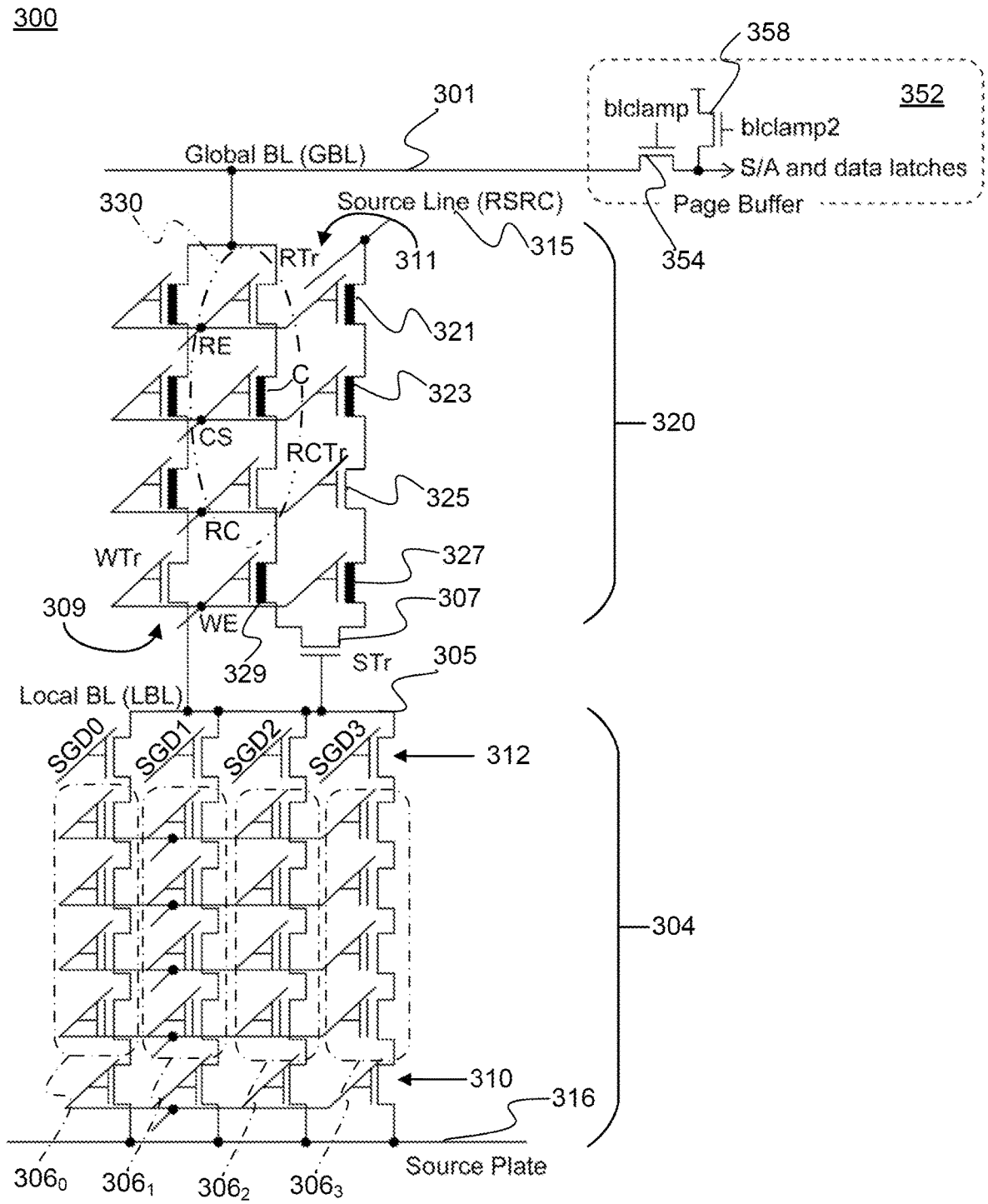
FIG. 3 is a schematic diagram of a portion of a memory device including a reading hardware with integrated micropump positioned between a global bitline and a sense transistor according to some embodiments.

FIG. 3 is a schematic diagram of a portion 300 of a memory device (e.g., of the memory device 130) including a reading hardware layer 320 with an integrated micropump 330 positioned between a global bitline 301 and a sense transistor 307 (STr) according to some embodiments. In embodiments, the portion 300 of the memory device includes an array of strings of memory cells (hereinafter array 304) coupled with the sense transistor 307, the reading hardware 320 coupled between the sense transistor 307 and the global bitline 301 (GBL), and a page buffer 352 coupled to the global bitline 301 with which to read data out of the memory cells of the array 304 and store the data in data latches (not shown).

In various embodiments, the array 304 includes a local bit line 305 coupled with NAND strings $306_0$ to $306_3$ (e.g., four sub-blocks of memory cells illustrated only by way of example) through drain select transistors 312. The NAND strings $306_0$ to $306_3$ are also coupled to source select transistors 310, which are in turn coupled to a common source 316, which in 3D NAND, can be a source plate layer, for example. In these embodiments, the page buffer 352 includes a first clamp transistor 354 coupled in line with the global bitline 301 and controllable by a bitline clamp signal (blclamp), a second clamp transistor 358 having a source coupled to the global bitline 301 and controllable by a second bitline clamp signal (blclamp2), a sense amplifier (S/A), and data latches. In embodiments, the clamp transistors 354 and 358 activate the global bitline 301 and attempt to keep the global bitline 301 pulled up in voltage when the sense transistor 307 turns on and transfers data (e.g., sense voltage levels) from a selected memory cell of the array 304 to the global bitline 301.

In at least some embodiments, the reading hardware layer 320 includes a write series of transistors 309 and a read series of transistors 311, each series of transistors having series-connected transistors. In both the write series of transistors 309 and the read series of transistors 311, transistors with a typical channel size can be understood as enhanced-type transistors and transistors with a thickened channel size (darkened, thick line) are depletion-type transistors. The enhanced-type transistors operate in typical operating ranges (Vt greater than zero volts) and can function as a switch via controlling a gate terminal thereof. The depletion-type transistors operate in a depletion range (Vt less than zero volts) and therefore are always on and conducting current. The write transistor (Wtr) of the write series of transistors 309 is the transistor of the write series of transistor 309 that is the enhanced-type transistor and is controllable via a write enable (WE) signal to store data (e.g., specific voltage level) to the memory cells of the array 304.

In these embodiments, the read series of transistors 311 is coupled between a source line 315 (RSRC) and the sense transistor 307 and between the sense transistor 307 and the global bitline 301. In embodiments, the source line 315 is grounded except when erasing memory cells of the array 304, when the source line 315 is left floating. More specifically, the read series of transistors 311 includes a first portion coupled between the source line 315 and a source of the sense transistor 307 and a second portion coupled between a drain of the sense transistor 307 and the global bitline 301.

In at least some embodiments, the micropump 330 is integrated within the second portion of the read series of transistors 311. In embodiments, control logic (e.g., the program manager 137 of the local media controller 135) is coupled with the write series of transistors 309, with the read series of transistors 311, with the array 304, and with the page buffer 352. The control logic can be configured to, during a read operation of a memory cell of the array 304 and in response to the sense transistor 307 turning on, activate the micropump 330 to cause a constant read current to flow between the global bitline 301 and the source line 315. In these embodiments, in response to activation of the micropump 330, the page buffer 352 reads, from the global bitline 301, a charge that represents a threshold voltage state of the memory cell. Further, the micropump 330 is configured to pass the charge from the sense transistor 307 to the global bitline 301, as will be described in more detail.

FIG. 4A is a schematic diagram of the micropump 330 of FIG. 3 according to an embodiment. With additional reference to FIG. 3, the micropump 330 includes a read transistor (RTr) coupled with the global bitline 301, a read capacitor transistor (RCTr) coupled with the sense transistor 307, and a capacitor (C) coupled between the read transistor and the read capacitor transistor. In embodiments, the read transistor (RTr) and the read capacitor transistor (RCTr) are each an enhanced-type transistor and are thus controllable by the control logic.

In at least some embodiments, to operate the micropump 330, the control logic turns ON the read transistor (RTr) with a read enable (RE) signal at a gate terminal to charge the capacitor. In embodiments, after turning off the read transistor (RTr), the control logic turns ON the read capacitor transistor (RCTr) with a read capacitor (RC) signal to transfer the charge from the capacitor (C) towards the sense transistor 307. In this way, the micropump 330 isolates the global bitline 301 from the sense transistor 307 and provides a constant current between the global bitline 301 and the sense transistor 307 for purposes of sensing data that has been read out by the sense transistor 307. A constant current as referred to herein can be within a small threshold of fixed current, such as between 5-15% of a constant current or other similar low variation in the read current.

More specifically, in various embodiments, the control logic repetitively: i) causes the read transistor (RTr) to turn ON; ii) after a first period, causes the read transistor to turn OFF, which leaves the capacitor (C) charged; iii) after the read transistor (RTr) is turned OFF, causes the read capacitor transistor (RCTr) to turn ON to transfer the charge from the capacitor to the sense transistor 307; and iv) after a second period, causes the read capacitor (RCTr) transistor to turn OFF, e.g., at completion of the charge transfer. This repetitive control of the micropump 330 can be understand to be similar to a series of coordinated clock pulses and can be generated using an oscillator or other clock-like signal generator. In some embodiments, the first period and the second period are equal, e.g., each being approximately 25 nanoseconds (ns), 50 ns, 75 ns, or 100 ns or the like. In some embodiments, the read transistor (RTr) and read capacitor transistor (RCTr) are clocked fast enough to keep the current constantly flowing while concurrently enabling the page buffer 352 to read voltage levels out of memory cells coupled with the sense transistor 307.

FIGS. 4B-4C is a perspective view and a top view, respectively, of the capacitor (C) of the micropump 330 of FIG. 4A according to some embodiments. In some embodiments, the capacitor (C) of the micropump 330 is a depletion-type transistor including a cylindrical gate 422 surrounding a semi-conductive pillar 444 of the micropump 330. In other words, the pillar referred to previously with reference to FIG. 2B (or a similar, but separate pillar) can also form the channel of the write series of transistors 309 and the read series of transistors 311. As illustrated in FIG. 4C, a radius (a) of the pillar is inside of and shorter than a radius (b) of the cylindrical gate 422, where electrons form at a boundary of the semi-conductive pillar 444 and holes form at an outer boundary of the cylindrical gate 422. A length (L) of the capacitor (C) is illustrated, which, together with the radii of the cylindrical gate 422 and the semi-conductive pillar 444, respectively, are dimensions that determine the capacitance of the capacitor (C) as per equation (1), $$C = \frac{2\pi\varepsilon_0 L}{\log\frac{b}{a}} \quad (1)$$

where $\varepsilon_0$ is equal to $8.8542 \times 10^{-12}$ Farad/meter (F/m).

With additional reference to FIG. 3, in some embodiments, the capacitor (C) is a first depletion-type transistor out of several depletion-type transistors. In these embodiments, the read series of transistors 311 further includes a second depletion-type transistor 321 coupled with the source line 315, a third depletion-type transistor 323 having a gate terminal coupled with a gate terminal of the first depletion-type transistor (C), and an enhanced-type transistor 325 coupled between the third depletion-type transistor 323 and the sense transistor 307. The enhanced-type transistor 325 has a gate terminal coupled with a gate terminal of the read capacitor transistor (RCTr). In embodiments, the read series of transistors 311 further includes a fourth depletion-type transistor 327 coupled between the enhanced-type transistor 325 and the sense transistor 307 and a fifth depletion-type transistor 329 coupled between the sense transistor 307 and the read capacitor transistor (RCTr). In some embodiments, the gate terminals of the write transistor (WTr) and the fourth and fifth depletion-type transistors 327 and 329 are coupled together.

Figure 5:
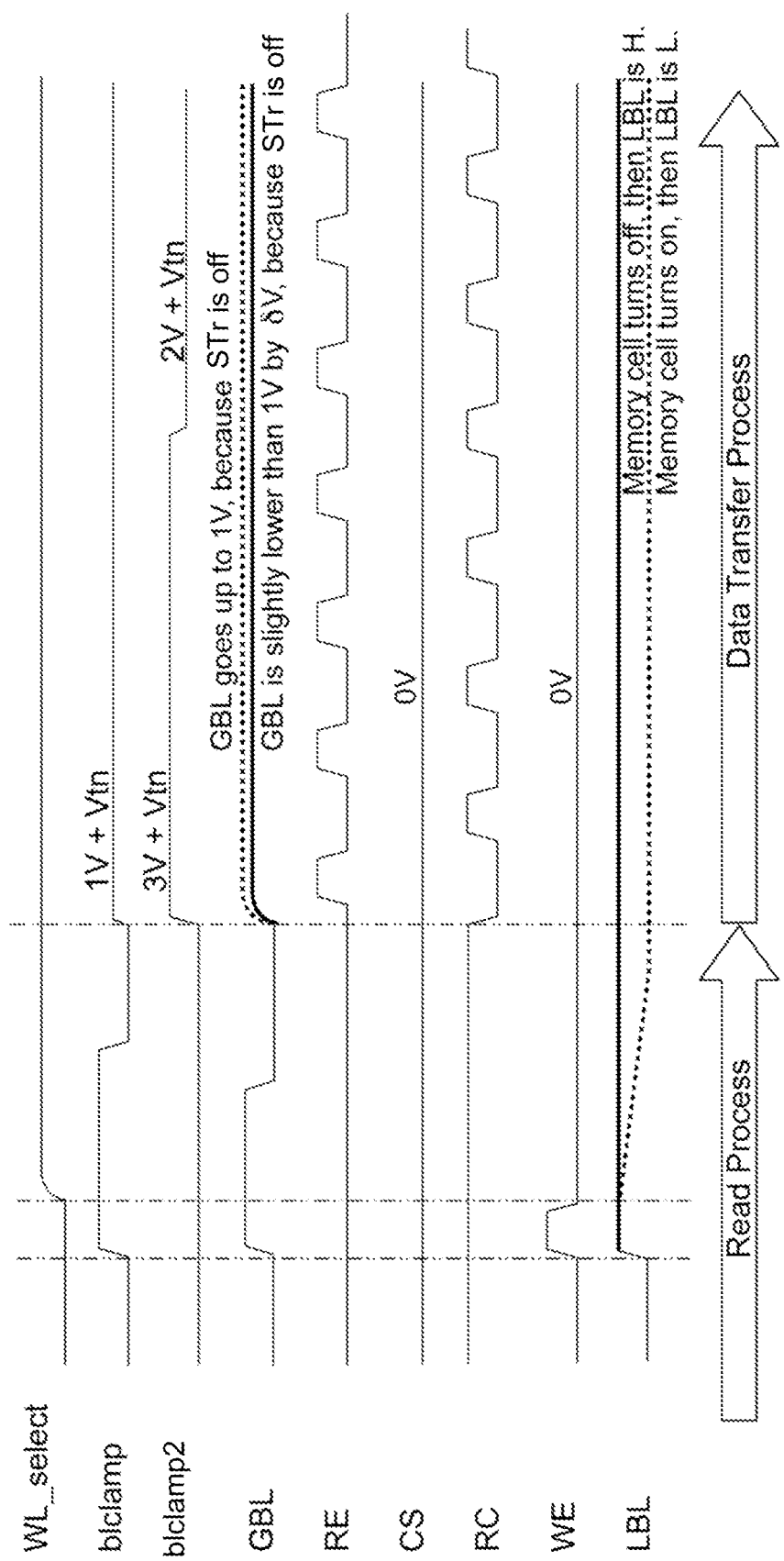
FIG. 5 is a set of graphs of control and data waveforms of the portion of the memory device during a read process and a data transfer process according to various embodiments.

FIG. 5 is a set of graphs of control and data waveforms (e.g., of signals) of the portion 300 of the memory device during a read process and a data transfer process according to various embodiments of the portion 300 of the memory device described in relation to FIG. 3. From top to bottom, the graphs include an example wordline select (WL_select) waveform for a memory cell being read, a global bitline clamp (blclamp) waveform, a global bitline (GBL) waveform, a read enable (RE) waveform, a capacitor sense (CS) waveform, a read capacitor (RC) waveform, a write enable (WE) waveform, and a local bitline (LBL) waveform. Control logic (e.g., the program manager 137) can be configured to control these waveform-based control signals.

In at least some embodiments, a read operation begins in a "read process" with pre-charging the read hardware 320 as the wordline voltage (WL_select) ramps to the selected memory cell. At this time, the global bitline (GBL) is also high and the read capacitor (RC) waveform has a high voltage to pass current through the micropump 330 and through the read series of transistor 311. Further, the write enable (WE) signal is also high for a brief time to facilitate current passing through the write series of transistors 309. The local bitline (LBL) signal is also activated to perform the read of data out of the memory cell.

In various embodiments, the voltage at the LBL will activate the sense transistor 307 (or STr) depending on whether the memory cell being read turns on or off. For example, if the memory cells turns off, then the LBL is at a high voltage and the global bitline (BGL) goes slightly lower, e.g., lower than 1V by a delta voltage (δV) amount because the sense transistor 307 is turned on. If the memory cell turns on, however, then the LBL is at a lower voltage (illustrated in LBL dotted line) and the GBL goes slightly higher (e.g., above 1V) because the sense transistor 307 is turned off, which is illustrated in GBL dotted line.

When the sense transistor 307 is activated, this begins the data transfer process to transfer charge levels from the LBL to the GBL so that the page buffer 352 can sense the charge level and determine what logical state corresponds to the charge level of the GBL. In at least some embodiments, in response to detecting the sense transistor 307 be activated by the LBL, the control logic activates the micropump 330 and causes the micropump 330 to repetitively cycle through charging and discharging the capacitor (C). This repetitive cycling of the micropump 330 causes a substantially constant current to be passed between the GBL 301 and the sense transistor 307 through the read series of transistors 311. Thus, the RE and RC waveforms (e.g., control signals) illustrate iterative clock cycles of turning on and off the read transistor (RTr) and the read capacitor transistor (RCTr), as was discussed previously. Further, the blclamp2 signal is activated to attempt to keep the GBL voltage to a sufficiently high, constant read voltage. The CS waveform signal can stay low, as the first depletion-type transistor (or capacitor) stays ON.

FIG. 6 is a flow diagram of an example method 600 of capacitive sensing using a micropump integrated within a memory device according to various embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the local media controller 135 (e.g., control logic) of FIGS. 1A-1B, e.g., by the program manager 137, on a memory array that includes a plurality of memory cells electrically coupled to a plurality of wordlines and a plurality of bitlines. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the global bitline 301 (GBL) is activated. For example, in one embodiment, the processing logic activates a write enable signal and a bitline clamp signal to pre-charge a global bitline coupled with a page buffer.

At operation 620, a selected wordline (WL) is ramped. For example, in one embodiment, the processing logic, after a pre-charge period, causes a voltage of a selected wordline to ramp up (e.g., gradually increase). The selected wordline is associated with a memory cell to be read by the page buffer.

At operation 630, the bitline clamp signal (blclamp) is deactivated. For example, in one embodiment, after a clamping period, the processing logic deactivates the bitline clamp signal (blclamp).

At operation 640, the micropump 330 is activated. For example, in one embodiment, the processing logic, in response to detecting the sense transistor 307 being turned on, activates the micropump 330 that is integrated within a data read path positioned, at least in part, between the sense transistor and the global bitline. A gate terminal of the sense transistor 307 is coupled with the local bitline that is associated with the memory cell, which is selected to be read. In some embodiments, in response to detecting the sense transistor 307 turn on, the processing logic also reactivates the bitline clamp signal (blclamp) and activates a second bitline clamp signal (blclamp2) to turn on a transistor coupled with a sense amplifier (S/A) and data latches of the page buffer 352.

In some embodiments, activating the micropump includes repetitively includes: i) causing a read transistor to turn on, the read transistor being coupled between the global bitline and a capacitor; ii) after a first period, causing the read transistor to turn off; iii) after the read transistor is turned off, causing a read capacitor transistor to turn on, the read capacitor transistor being coupled between the sense transistor and the capacitor; and iv) after a second period, causing the read capacitor transistor to turn off.

Figure 7:
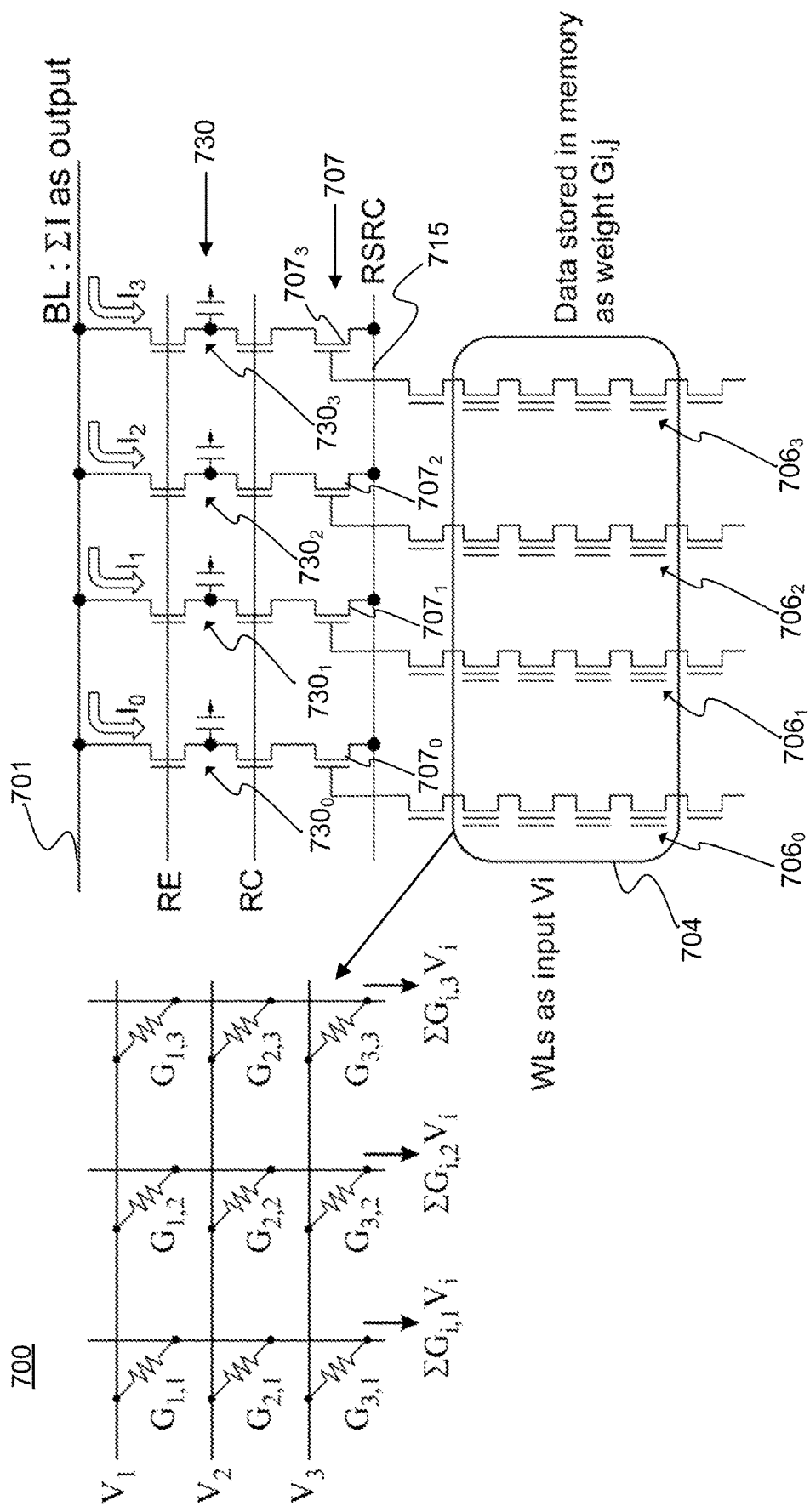
FIG. 7 is a schematic diagram of a memory device employing micropumps within circuitry associated with computing-in-memory architecture according to an embodiment.

FIG. 7 is a schematic diagram of a memory device 700 employing micropumps within circuitry associated with computing-in-memory (CiM) architecture according to an embodiment. In some embodiments, the memory device 700 illustrates at least a portion of the memory device 130 already discussed. The CiM architecture within the memory device can be integrated within a computing device designed to perform machine learning (ML) or other artificial intelligence (AI) computing. The memory device 700, in some embodiments, includes an array of memory cells (e.g., an array 704) having individual strings of memory cells $706_0$-$706_3$ where data is stored in memory as weights ($G_{i,j}$). In these embodiments, the wordlines (WLs) are inputs (Vi) to this matrix of different weights, enabling control logic (e.g., the program manager 137) to cause the proper weights to be output to a global bitline 701. When performed concurrently, two or more of these weights are summed as current ($\Sigma I = I_0 + I_1 + I_2 + I_3$) onto the global bitline 701 and read (or sensed) by a page buffer (such as the page buffer 152 or 352) as an output of the CiM architecture. By summing the current, the control logic may be configured to generate and act on a large variety of different granular current values representing calculated intermediate values or final output values of the CiM architecture.

In at least some embodiments, the memory device 700 includes a sense transistor 707 coupled between a source line 715 (RSRC) and the global bitline 701 and which is operable at a gate terminal by a drain side of one of the strings of memory cells $706_0$-$706_3$. A micropump 730 is integrated into the CiM architecture 700 as being coupled between each respective string of memory cells $706_0$-$706_3$ and the global bitline 701. In some embodiments, each micropump 730 is constructed the same or similarly to the micropump 330 (see FIG. 3 and FIGS. 4A-4C). The source line 715 can also be similar to the source line 315 of FIG. 3. In these embodiments, each micropump 730, when controlled similarly as described with reference to FIGS. 4A-4C and FIG. 5, provides a constant current for each string of memory cells so that the charge (current) read out and combined at the global bitline 701 has a fine granularity of accuracy. This fine granularity of accuracy may be accurate to a threshold level of accuracy as may be required for an ML/AI application carried out by the memory device 700. In embodiments, as accuracy of current level increases, it is possible to sum up more current within a limited error range at the same time. This means CiM-based calculation performance improves. The fine granularity contributes to a better performance of ML/AI system. In the auto industry, for example, accurate and high-speed calculation is sought especially for autonomous driving.

In at least one embodiment, the memory device 700 includes the array 704 of memory cells having, for purposes of explanation, a first string $706_0$, a second string $706_1$, a third string $706_2$, and a fourth string $706_3$ of memory cells, although fewer and more strings of memory cells are envisioned. The memory device 700 further includes the global bitline 701 (e.g., a bitline for simplicity), coupled with sensing circuitry, configured to provide a first read current to the first string $706_0$, a second read current to the second string $706_1$, a third read current to the third string $706_2$, and a fourth read current to the fourth string $706_3$. The sensing circuitry for example, can be included in a page buffer that has been discussed.

In at least some embodiments, the memory device 700 further includes a first sense transistor $707_0$ having a first gate terminal coupled with the first string $706_0$ and a first micropump $730_0$ coupled between the bitline and the first sense transistor $707_0$. In these embodiments, the memory device 700 further includes a second sense transistor $707_1$ having a second gate terminal coupled with the second string $706_1$ and a second micropump $730_1$ coupled between the bitline and the second sense transistor $707_1$. In these embodiments, the memory device 700 further includes a third sense transistor $707_2$ having a third gate terminal coupled with the third string $706_2$ and a third micropump $730_2$ coupled between the bitline and the third sense transistor $707_2$. In these embodiments, the memory device 700 further includes a fourth sense transistor $707_3$ having a fourth gate terminal coupled with the fourth string $706_3$ and a fourth micropump $730_3$ coupled between the bitline and the fourth sense transistor $707_3$.

In some embodiments, the control logic (e.g., the program manager 137) is coupled to the first micropump $730_0$, the second micropump $730_1$, the third micropump $730_2$, and the fourth micropump $730_3$. In at least some embodiments, the control logic concurrently activates the first micropump, the second micropump, the third micropump, and the fourth micropump such that the first current matches the second current, the third current matches the second read current, and/or the fourth current matches the third read current. In other words, the first read current, the second read current, the third read current, and the fourth read current can be substantially equal, e.g., within a threshold of accuracy in order to provide the fine granularity of accuracy in the combination of any of these four read currents.

In at least some embodiments, a source of each of the first sense transistor $707_0$, the second sense transistor $707_1$, the third sense transistor $707_2$, and the fourth sense transistor $707_3$ is coupled to a source line that is at a ground potential. A drain of each of the first sense transistor, the second sense transistor, third sense transistor, and fourth sense transistor can be coupled with the first micropump $730_0$, the second micropump $730_1$, the third micropump $730_2$, and fourth micropump $730_3$, respectively.

In various embodiments, in response to activation of the first micropump $730_0$ and the second micropump $730_1$ (listed only by way of example), the sensing circuitry reads, from the bitline, a total charge (e.g., current). This total charge or current represents at least a combination of a first threshold voltage state of a first memory cell of the first string $706_0$ and a second threshold voltage state of a second memory cell of the second string $706_1$. In these embodiments, the first micropump $730_0$ is to pass a first charge from the first sense transistor $707_0$ to the bitline 701 and the second micropump $730_1$ is to pass a second charge from the second sense transistor $707_1$ to the bitline, the first charge and the second charge being included in the total charge. In other embodiments, the total charge similarly includes threshold voltage(s) read from memory cells of the third string $706_2$ and/or the fourth string $706_3$, alone or in combination.

In some embodiments, any of the micropumps includes a read transistor coupled with the bitline, a read capacitor transistor coupled with the first sense transistor, and a capacitor coupled between the read transistor and the read capacitor transistor. In embodiments, to activate the first micropump, the control logic is to repetitively: cause the read transistor to turn on; after a first period, cause the read transistor to turn off; after the read transistor is turned off, cause the read capacitor transistor to turn on; and after a second period, cause the read capacitor transistor to turn off. In embodiments, the first period and the second period are equal. In embodiments, the capacitor is a depletion-type transistor including a cylindrical gate surrounding a semi-conductive pillar of the micropump.

Figure 8:
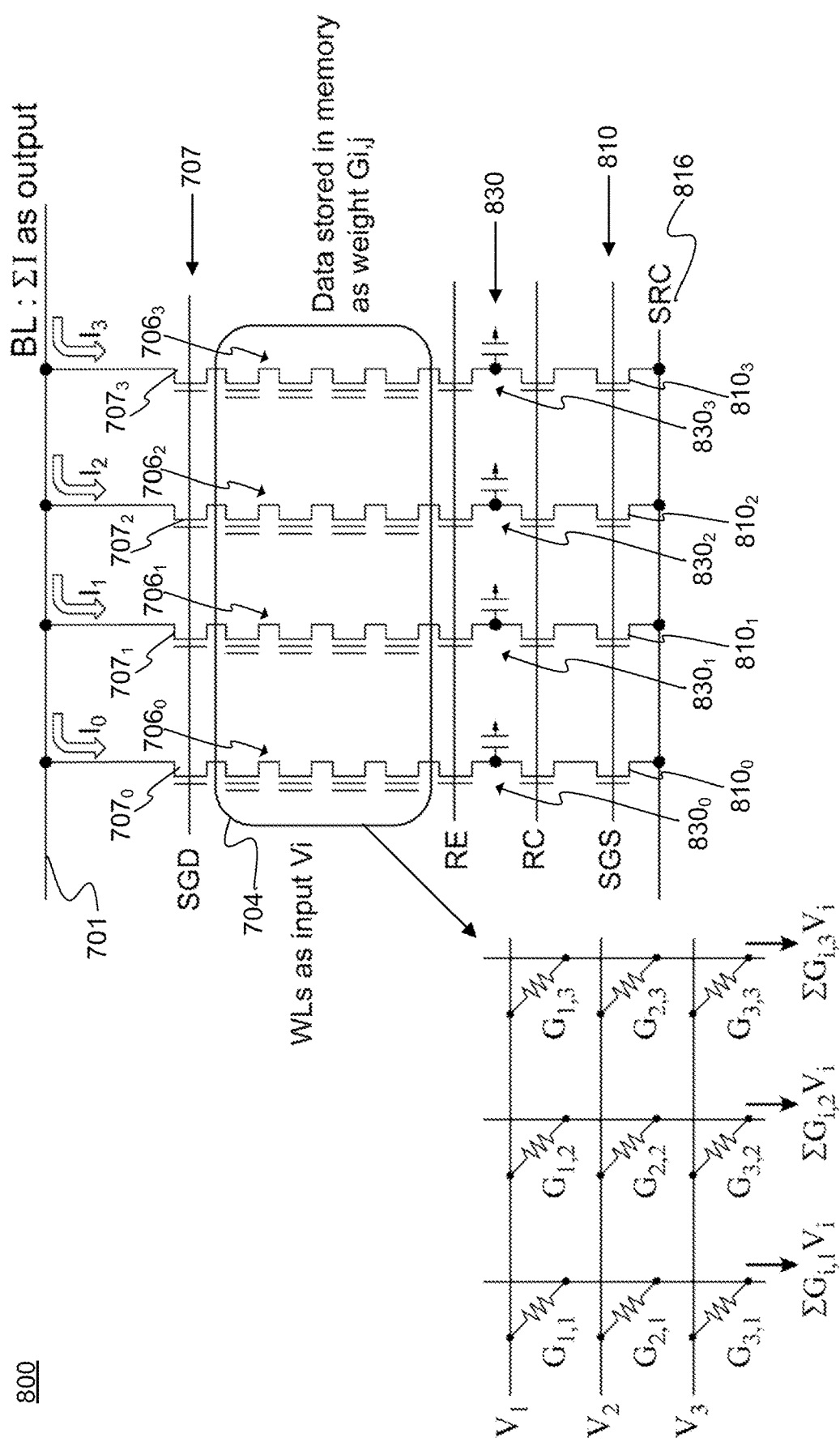
FIG. 8 is a schematic diagram of a memory device employing micropumps within circuitry associated with computing-in-memory architecture according to another embodiment.

FIG. 8 is a schematic diagram of a memory device 800 employing micropumps within circuitry associated with computing-in-memory (CiM) architecture according to another embodiment. The memory device 800 also includes a CiM architecture, but with a variation from the memory device 700 of FIG. 7. In embodiments of the memory device 800, a set of micropumps 830 is instead coupled between the array 704 and a set of source select transistors 810 having source terminals coupled to a common source 816 (SRC).

More specifically, in at least some embodiments, the memory device 800 includes a first micropump $830_0$ coupled between the first string $706_0$ and a first source select transistor $810_0$, a second micropump $830_1$ coupled between the second string $706_1$ and a second source select transistor $810_1$, a third micropump $830_2$ coupled between the third string $706_2$ and a third source select transistor $810_2$, and a fourth micropump $830_3$ coupled between the fourth string $706_3$ and a fourth source select transistor $810_3$. While some reading hardware (not shown) may still be coupled between each respective sense transistor $707_0$-$707_3$ of a set of sense transistors 707 and the array 704, the page buffer will still sense combined current levels coming concurrently from at least some of the strings of memory cells $706_0$-$706_3$ via the sense transistors 707.

In these embodiments, each micropump 830, when controlled similarly as described with reference to FIGS. 4A-4C and FIG. 5, provides a constant current for each string of memory cells so that the charge (current) read out and combined at the global bitline 701 has a fine granularity of accuracy. This fine granularity of accuracy may be accurate to a threshold level of accuracy as may be required for an ML/AI application carried out by the memory device 800.

Figure 9:
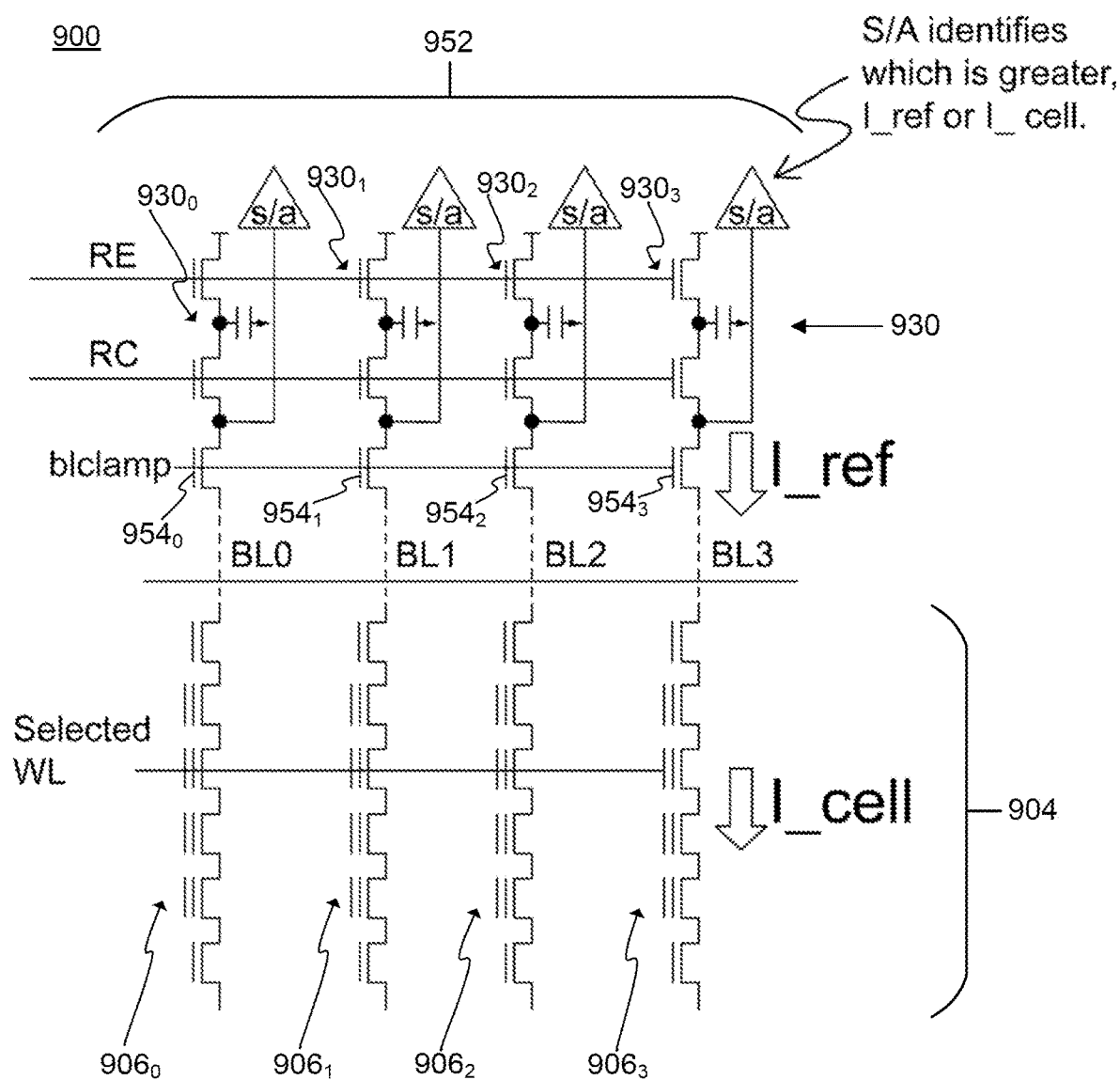
FIG. 9 is a schematic diagram of a memory device with a page buffer employing micropumps to generate a reference current for each string of a memory array according to at least some embodiments.

FIG. 9 is a schematic diagram of a memory device 900 with a page buffer 952 employing micropumps to generate a reference current for each string of a memory array according to at least some embodiments. More specifically, the memory device 900 includes an array of memory cells (e.g., an array 906) that includes various strings of memory cells, including a first string $906_0$ coupled with a first bitline (BL0), a second string $906_0$ coupled with a second bitline (BL1), a third string $906_0$ coupled with a third bitline (BL2), and a fourth string $906_0$ coupled with a fourth bitline (BL3).

In some memory devices, a reference current is generated by the page buffer 952 for each string using a current mirror. However, the current fluctuates string-by-string due to Vt mismatch in the (typically P-type) transistors employed in such current mirrors. Even with use of large P-type transistors, the current can vary from between −50% to +100% in the various branches of a current mirror. For this reason, current mirrors are not employed and other more costly ways of generating reference current by the page buffer 92 are employed.

In at least some embodiments, these deficiencies in employing current mirrors are overcome by generating the reference current for each string of memory cells using a separate micropump with a carefully-designed capacitor (e.g., depletion-type transistor that has a cylindrical gate surrounding a semi-conductive pillar and sized) for predictably small current variation. For example, within the page buffer 952, a first micropump $930_0$ can be coupled between a first clamp transistor $954_0$ and a voltage source, a second micropump $930_1$ can be coupled between a second clamp transistor $954_1$ and the voltage source, a third micropump $930_2$ can be coupled between a third clamp transistor $954_2$ and the voltage source, and a fourth micropump $930_3$ can be coupled between a fourth clamp transistor $954_3$ and the voltage source. Each micropump $930_0$-$930_3$ can be operated similarly as discussed with reference to FIG. 3 and FIGS. 4A-4C, e.g., by control signals that are timed based off activation, in this case, of each corresponding bitline clamp transistor $954_0$-$954_3$, respectively.

In these embodiments, each sense amplifier (S/A), which is coupled to a point joining each micropump with a respective clamp transistor, accurately determines when the reference current (I_ref) is greater than the memory cell current (I_cell) of a selected memory cell being read. The variability of the reference current generated by these micropumps may be an order of magnitude smaller than that of employing a current mirror, e.g., detectable within a small variation of the gate oxide thickness of the sense amplifiers (S/A's). In some embodiments, the various strings $906_0$-$906_3$ (which are not limited to four) can be understood to also be arrays of memory cells, where a string of memory cells at a time is selected by a select drain (or select) source transistor for each bitline, which depends on architecture of the memory device 900.

Figure 10:
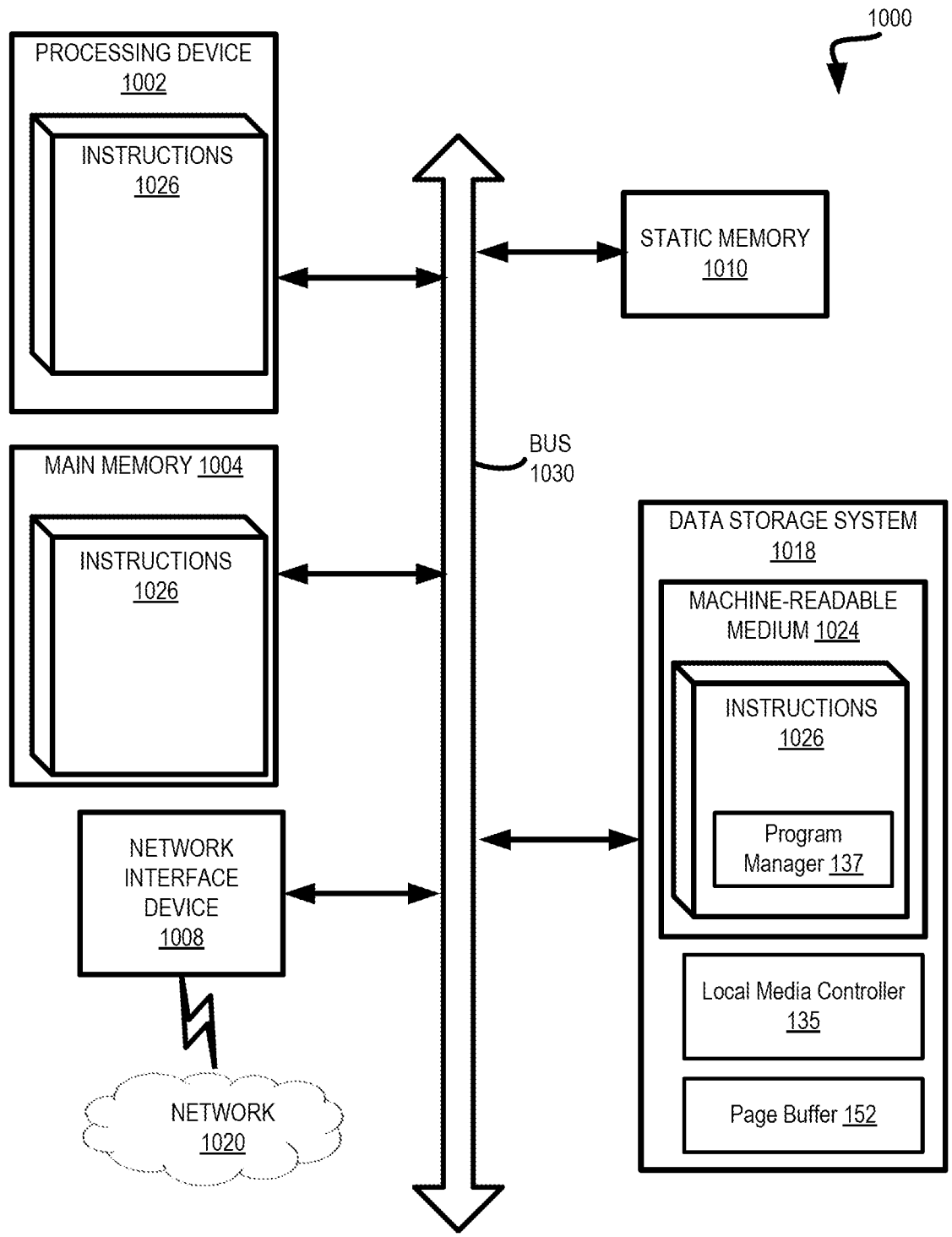
FIG. 10 is a block diagram of an example computer system in which embodiments of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the memory sub-system controller 115 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1010 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1028 for performing the operations and steps discussed herein. The computer system 1000 can further include a network interface device 1012 to communicate over the network 1020.

The data storage system 1018 can include a machine-readable storage medium 1024 (also known as a non-transitory computer-readable storage medium) on which is stored one or more sets of instructions 1026 or software embodying any one or more of the methodologies or functions described herein, including those associated with the program manager 137. The data storage system 1018 can further include the local media controller 135 and the page buffer 152 that were previously discussed. The instructions 1028 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1A.

In one embodiment, the instructions 1026 include instructions to implement functionality corresponding to a controller (e.g., the memory sub-system controller 115 of FIG. 1A). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
an array of strings of memory cells;
a local bitline coupled with a plurality of the strings of memory cells;
a sense transistor having a gate terminal coupled with the local bitline;
a series of transistors that comprises a data read path between a source line and the sense transistor and between the sense transistor and a global bitline that is coupled with a page buffer;
a micropump that is integrated within the series of transistors; and
control logic coupled with the series of transistors, the control logic to, during a read operation of a memory cell of the array and in response to the sense transistor turning on, activate the micropump to cause a constant read current to flow between the global bitline and the source line.

2. The memory device of claim 1, further comprising the page buffer, wherein:
in response to activation of the micropump, the page buffer is to read, from the global bitline, a charge that represents a threshold voltage state of the memory cell; and
the micropump is to pass the charge from the sense transistor to the global bitline.

3. The memory device of claim 1, wherein a first portion of the series of transistors is coupled between the source line and a source of the sense transistor, and wherein a second portion of the series of transistors is coupled between a drain of the sense transistor and the global bitline, the micropump being integrated within the second portion.

4. The memory device of claim 1, wherein the micropump comprises:
a read transistor coupled with the global bitline;
a read capacitor transistor coupled with the sense transistor; and
a capacitor coupled between the read transistor and the read capacitor transistor, and wherein to activate the micropump, the control logic is to repetitively:
cause the read transistor to turn on;
after a first period, cause the read transistor to turn off;
after the read transistor is turned off, cause the read capacitor transistor to turn on; and
after a second period, cause the read capacitor transistor to turn off.

5. The memory device of claim 4, wherein the first period and the second period are equal.

6. The memory device of claim 4, wherein the capacitor is a depletion-type transistor comprising a cylindrical gate surrounding a semi-conductive pillar of the micropump.

7. The memory device of claim 4, wherein the capacitor is a first depletion-type transistor, and wherein the series of transistors further comprises:
a second depletion-type transistor coupled with the source line;
a third depletion-type transistor having a gate terminal coupled with a gate terminal of the first depletion-type transistor; and
an enhanced-type transistor coupled between the third depletion-type transistor and the sense transistor, the enhanced-type transistor having a gate terminal coupled with a gate terminal of the read capacitor transistor.

8. The memory device of claim 7, wherein the series of transistors further comprises:
a fourth depletion-type transistor coupled between the enhanced-type transistor and the sense transistor; and
a fifth depletion-type transistor coupled between the sense transistor and the read capacitor transistor.

9. A method comprising:
activating, by control logic of a memory device, a write enable signal and a bitline clamp signal to pre-charge a global bitline coupled with a page buffer;
after a pre-charge period, causing a voltage of a selected wordline to ramp up, the selected wordline being associated with a memory cell to be read by the page buffer;
after a clamping period, deactivating the bitline clamp signal; and
in response to detecting a sense transistor being turned on, activating a micropump that is integrated within a data read path positioned, at least in part, between the sense transistor and the global bitline, wherein a gate terminal of the sense transistor is coupled with a local bitline that is associated with the memory cell.

10. The method of claim 9, further comprising, in response to detecting the sense transistor turn on:
reactivating the bitline clamp signal; and
activating a second bitline clamp signal to turn on a transistor coupled with a sense amplifier and data latches of the page buffer.

11. The method of claim 9, wherein activating the micropump comprises repetitively:
causing a read transistor to turn on, the read transistor being coupled between the global bitline and a capacitor;
after a first period, causing the read transistor to turn off;
after the read transistor is turned off, causing a read capacitor transistor to turn on, the read capacitor transistor being coupled between the sense transistor and the capacitor; and
after a second period, causing the read capacitor transistor to turn off.

12. The method of claim 11, wherein the first period and the second period are equal.

13. The method of claim 11, further comprising employing a depletion-type transistor to implement the capacitor, the depletion-type transistor comprising a cylindrical gate surrounding a semi-conductive pillar of the micropump.

14. A memory device comprising:
an array of memory cells comprising at least a first string and a second string;
a bitline, coupled with sensing circuitry, configured to provide a first read current to the first string and a second read current to the second string;
a first sense transistor having a first gate terminal coupled with the first string;
a first micropump coupled between the bitline and the first sense transistor;
a second sense transistor having a second gate terminal coupled with the second string;
a second micropump coupled between the bitline and the second sense transistor; and
control logic coupled to the first micropump and the second micropump, the control logic to concurrently activate the first micropump and the second micropump such that the first read current matches the second read current.

15. The memory device of claim 14, wherein a source of each of the first sense transistor and the second sense transistor is coupled to a source line that is at a ground potential.

16. The memory device of claim 14, wherein a drain of each of the first sense transistor and the second sense transistor is coupled with the first micropump and the second micropump, respectively.

17. The memory device of claim 14, further comprising the sensing circuitry, wherein:
in response to activation of the first micropump and the second micropump, the sensing circuitry is to read, from the bitline, a total charge that represents at least a combination of:
a first threshold voltage state of a first memory cell of the first string; and
a second threshold voltage state of a second memory cell of the second string;
the first micropump is to pass a first charge from the first sense transistor to the bitline; and
the second micropump is to pass a second charge from the second sense transistor to the bitline, the first charge and the second charge being included in the total charge.

18. The memory device of claim 14, wherein the first micropump comprises:
a read transistor coupled with the bitline;
a read capacitor transistor coupled with the first sense transistor; and
a capacitor coupled between the read transistor and the read capacitor transistor, and wherein to activate the first micropump, the control logic is to repetitively:
cause the read transistor to turn on;
after a first period, cause the read transistor to turn off;
after the read transistor is turned off, cause the read capacitor transistor to turn on; and
after a second period, cause the read capacitor transistor to turn off.

19. The memory device of claim 18, wherein the first period and the second period are equal.

20. The memory device of claim 18, wherein the capacitor is a depletion-type transistor comprising a cylindrical gate surrounding a semi-conductive pillar of the micropump.

* * * * *